United States Patent
Huang

(10) Patent No.: US 11,921,667 B2
(45) Date of Patent: Mar. 5, 2024

(54) RECONFIGURABLE COMPUTING CHIP

(71) Applicant: Beijing ESWIN Computing Technology Co., Ltd., Beijing (CN)

(72) Inventor: Yang Huang, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/077,362

(22) Filed: Dec. 8, 2022

(65) Prior Publication Data

US 2023/0185761 A1 Jun. 15, 2023

(30) Foreign Application Priority Data

Dec. 9, 2021 (CN) .......................... 202111497267.2

(51) Int. Cl.
*G06F 15/78* (2006.01)
*G06F 12/0842* (2016.01)

(52) U.S. Cl.
CPC ...... *G06F 15/7892* (2013.01); *G06F 12/0842* (2013.01)

(58) Field of Classification Search
CPC .............. G06F 15/7892; G06F 12/0842; G06F 15/7867; Y02D 10/00; G06N 3/045; G06N 3/08
USPC ........................................................ 709/221
See application file for complete search history.

(56) References Cited

U.S. PATENT DOCUMENTS

| | | | | |
|---|---|---|---|---|
| 2018/0285715 A1* | 10/2018 | Son | ........................ | G06N 3/04 |
| 2019/0130250 A1* | 5/2019 | Park | ........................ | G06F 17/15 |
| 2019/0196968 A1* | 6/2019 | Beckmann | .......... | G06F 12/0811 |
| 2020/0183834 A1* | 6/2020 | Folliot | ................ | G06F 12/0207 |
| 2022/0092394 A1* | 3/2022 | Lee | ........................ | G06N 3/045 |
| 2022/0156508 A1* | 5/2022 | Moons | .................... | G06N 3/082 |

FOREIGN PATENT DOCUMENTS

| | | |
|---|---|---|
| CN | 108805266 A | 11/2018 |
| CN | 111178519 A | 5/2020 |

* cited by examiner

*Primary Examiner* — Eric Coleman
(74) *Attorney, Agent, or Firm* — Carter, DeLuca & Farrell LLP

(57) ABSTRACT

A reconfigurable computing chip, a method for configuring the reconfigurable computing chip, a method for convolution process, a device for convolution process, a computer readable storage medium and a computer program product are provided. The reconfigurable computing chip comprises a processing module including multiple processing cores sharing a first cache, wherein each of the plurality of processing cores includes multiple processing elements sharing a second cache, each of the plurality of processing elements monopolizes a third cache corresponding to said processing element, wherein the reconfigurable computing chip is dynamically configured to perform convolution process on an input feature map and a convolution kernel to obtain an output feature map, and each of the multiple processing elements is dynamically configured to perform a multiplication-plus-addition process on a part of the input feature map and a part of the convolution kernel to obtain a part of the output feature map.

20 Claims, 5 Drawing Sheets

RECONFIGURABLE COMPUTING CHIP

The present application claims priority to Chinese Patent Application No. 202111497267.2, filed on Dec. 9, 2021, the disclosure of which is incorporated herein by reference in its entirety as part of the present application.

TECHNICAL FIELD

The present disclosure relates to a reconfigurable computing chip, a method for configuring the reconfigurable computing chip, a method for convolution process, a device for convolution process, a computer readable storage medium and a computer program product.

BACKGROUND

Reconfigurable computing is a parallel computing mode in a spatial domain, which organizes computing resources of different granularities and different functionalities with a hardware structure in the spatial domain. At runtime, in accordance with the characteristics of data flow, the configured hardware resources are interconnected to form a relatively fixed computation path, and the computation is performed in a way approximate to a "dedicated circuit". When the algorithm and the application are transformed, the hardware structure is reconfigured into different computation paths by configuring again, to execute the transformed algorithm and application.

Due to the high flexibility and high efficiency of reconfigurable computing, a scheme for reconfigurable computing may be broadly applied to neural network-related computations. For example, the scheme for reconfigurable computing may dynamically allocate computing hardware resources for the training and reasoning procedure of the neural network, so as to realize the neural network-related computations with highly adaptive hardware resources.

However, with respect to computations involved in CNN (Convolutional Neural Network), which is common in terms of neural networks, there is no effective scheme to dynamically allocate reconfigurable computing resources. To this end, a scheme for dynamically optimizing configuration, which can satisfy the computations involved in CNN, is needed, in order to further improve the utilization rate of reconfigurable computing resources and improve the efficiency of reading, writing, and computing for data.

SUMMARY

In order to solve the above-described problems, embodiments of the present disclosure provide a reconfigurable computing chip, a method for configuring a reconfigurable computing chip, a method for convolution process, a device for convolution process, a computer-readable storage medium, and a computer program product.

The embodiments of the present disclosure provide a reconfigurable computing chip, which comprises a processing module including a plurality of processing cores sharing a first cache, wherein each of the plurality of processing cores includes a plurality of processing elements sharing a second cache, and each of the plurality of processing elements monopolizes a third cache corresponding to said processing element, wherein the reconfigurable computing chip is dynamically configured to perform convolution process on an input feature map and a convolution kernel to obtain an output feature map, and each of the plurality of processing elements is dynamically configured to perform a multiplication-plus-addition process on a part of the input feature map and a part of the convolution kernel to obtain a part of the output feature map.

For example, the first cache includes L2 cache and/or L3 cache, the second cache includes L1 cache, and the third cache includes L0 cache.

For example, computation paths and/or data paths of the reconfigurable computing chip are reconfigured to perform the convolution process, based at least in part on individual dimensions of the input feature map, the convolution kernel, and the output feature map.

For example, each of the plurality of processing elements is dynamically configured to perform multiplication-plus-addition process on a corresponding part of the input feature map and a corresponding part of the convolution kernel, based at least in part on a mapping relationship from the convolution process to the computation paths of the reconfigurable computing chip.

The embodiments of the present disclosure provide a method for configuring a reconfigurable computing chip, which comprises: determining search spaces corresponding to individual dimensions, based on multiple dimensions of an input feature map, multiple dimensions of a convolution kernel, and multiple dimensions of an output feature map, wherein the output feature map is a convolution result of performing convolution process on the input feature map and the convolution kernel; determining a mapping relationship from the convolution process to data paths and/or computation paths of the reconfigurable computing chip, based on hardware parameters of the reconfigurable computing chip and the search spaces corresponding to individual dimensions; and configuring the reconfigurable computing chip based on the mapping relationship.

For example, the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

For example, the determining search spaces corresponding to individual dimensions, based on multiple dimensions of an input feature map, multiple dimensions of a convolution kernel, and multiple dimensions of an output feature map further comprises: determining a number of dimension factors corresponding to individual dimensions of the input feature map, the convolution kernel, and the output feature map, based on storage architecture and processing architecture of the reconfigurable computing chip; and determining search spaces corresponding to individual dimensions, based on the individual dimensions and the number of dimension factors corresponding to the individual dimensions.

For example, the determining a mapping relationship from the convolution process to data paths and/or computation paths of the reconfigurable computing chip, based on hardware parameters of the reconfigurable computing chip and the search spaces corresponding to individual dimensions further comprises: determining sets of private constraints corresponding to individual dimensions, based on the hardware parameters of the reconfigurable computing chip; determining private search spaces corresponding to individual dimensions, based on the sets of private constraints and the search spaces corresponding to the individual dimensions; determining the mapping relationship from the convolution process to the data paths and/or the computation paths of the reconfigurable computing chip, based on the private search spaces corresponding to individual dimensions.

For example, the determining the mapping relationship from the convolution process to the computation paths of the reconfigurable computing chip, based on the private search spaces corresponding to the individual dimensions further comprises: determining a set of joint constraints corresponding to at least two of the individual dimensions, based on the hardware parameters of the reconfigurable computing chip; determining a global search space, based on the set of joint constraints and the private search spaces corresponding to individual dimensions, the global search space corresponding to all of the operable data paths and/or computation paths on which convolution process is performed by the reconfigurable computing chip; and determining the mapping relationship from the convolution process to the computation paths of the reconfigurable computation chip, based on the global search space.

For example, the determining the mapping relationship from the convolution process to the data paths and/or the computation paths of the reconfigurable computing chip, based on the global search space further comprises: determining a score corresponding to all operable data paths and/or computation paths, based on the global search space, the score being a weighted sun of utilization rate, power consumption and computing speed of individual processing elements of the reconfigurable computing chip in a case that the reconfigurable computing chip performs convolution process according to the operable data paths and/or computation paths; and determining the mapping relationship from the convolution process to the computation paths of the reconfigurable computing chip, based on the score corresponding to all of the operable data paths and/or computation paths.

For example, the configuring the reconfigurable computing chip based on the mapping relationship further comprises: adjusting dimension factors corresponding to a first sub-computation path and a second sub-computation path, based on the mapping relationship, wherein the first sub-computation path corresponds to a sub-computation path associated with the processing element of the reconfigurable computing chip acquiring data from the third cache, and the second sub-computation path corresponds to a sub-computation path corresponding to the processing element of the reconfigurable computing chip acquiring data from the second cache.

For example, the configuring the reconfigurable computing chip based on the mapping relationship further comprises: determining data reuse rate corresponding to individual ones in a set of parallel subtask allocation schemes, based on the set of parallel subtask allocation schemes corresponding to the mapping relationship; determining a parallel subtask allocation scheme corresponding to the mapping relationship, based on the data reuse rate; and allocating data to be computed by the processing element of the reconfigurable computing chip, based on the parallel subtask allocation scheme corresponding to the mapping relationship.

The embodiments of the present disclosure provide a method for convolution process, which comprises: performing convolution process on an input feature map and a convolution kernel with a reconfigurable computing chip to obtain an output feature map, wherein a plurality of processing elements of the reconfigurable computing chip are dynamically configured to perform a multiplication-plus-addition process on a part of the input feature map and a part of the convolution kernel to obtain a part of the output feature map; wherein the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

According to an aspect of the embodiments of the present disclosure, there is provided a device for convolution process, which comprises: one or more processors; and one or more memories having stored therein computer-readable codes which, when executed by the one or more processors, cause the one or more processors to perform the method as described above.

According to another aspect of the embodiments of the present disclosure, there is provided a computer-readable storage medium having stored thereon computer-readable instructions which, when executed by a processor, cause the processor to perform the method as described in any of the individual aspects above of the present disclosure.

According to another aspect of the embodiments of the present disclosure, there is provided a computer program product comprising computer readable instructions which, when executed by a processor, cause the processor to perform the method as described in any of the individual aspects above of the present disclosure.

According to the embodiments of the present disclosure, an operator mapping scheme is scored by a reliable and effective operator mapping evaluation model, so that an optimal mapping scheme specific to CNN convolution operator may be searched out from among possible dynamical configuration schemes as short-time as possible.

Furthermore, after filtering out the optimal mapping scheme specific to CNN convolution operator, the embodiments of the present disclosure further improve the efficiency of reading, writing, and computing for data by further optimizing the data splitting rules and the scheme for assigning parallel computing tasks to processing elements.

Some aspects of the present disclosure may also achieve the following beneficial technical effects:

1. Some aspects of the present disclosure introduce double constraints to filter the search spaces, reduce the size of the global search space, and reduce the search time.
2. Some aspects of the present disclosure also introduce an operator mapping evaluation model in an analytical mode to compute evaluation metrics. For example, the operator mapping evaluation model based on combined parameter computations of the operator mapping scheme greatly shortens the time consumed for computation by the operator mapping evaluation model, compared with a simulation mode (based on simulation statistics of a chip simulator).
3. Some aspects of the present disclosure also introduce comprehensive evaluation metrics (related to an output of a function of a plurality of single evaluation metrics) to score the operator mapping scheme, and compared with a single evaluation metric (such as utilization rate, power consumption, data reuse rate, etc. of PEs), it is possible to obtain an operator mapping scheme with a more comprehensive performance.
4. Some aspects of the present disclosure also introduce an operator mapping evaluation model in a caching mode. Before performing a certain computation step, the evaluation model first checks whether the intermediate result corresponding to the computation step is cached, and if so, it acquires the cached result; otherwise if not, it computes directly and caches the intermediate result. This caching operation can speed up the search procedure and reduce the search time.
5. Some aspects of the present disclosure also exchange the order of dimension factors in L1 loop body and PE loop body during data splitting, so as to guarantee the data continuity for the L1 cache, improve the efficiency of reading and writing, and speed up the computation of operator.
6. Some aspects of the present disclosure also introduce a filtering rule based on reuse rate, and assign parallel subtasks to a corresponding PE in the processing module for execution, thus reducing the amount of data moved and the power consumption.

BRIEF DESCRIPTION OF DRAWINGS

The above and other objects, features, and advantages of the embodiments of the present disclosure will become more apparent, by more detailed description of the embodiments of the present disclosure in conjunction with the accompanying drawings. The accompanying drawings are used to provide a further understanding of the embodiments of the present disclosure, and to constitute a part of the specification. Together with the embodiments of the present disclosure, the accompanying drawings also serve to explain the present disclosure, and do not constitute a limitation to the present disclosure. In the accompanying drawings, like reference numerals usually represent like parts or steps.

DETAILED DESCRIPTION

Figure 1:
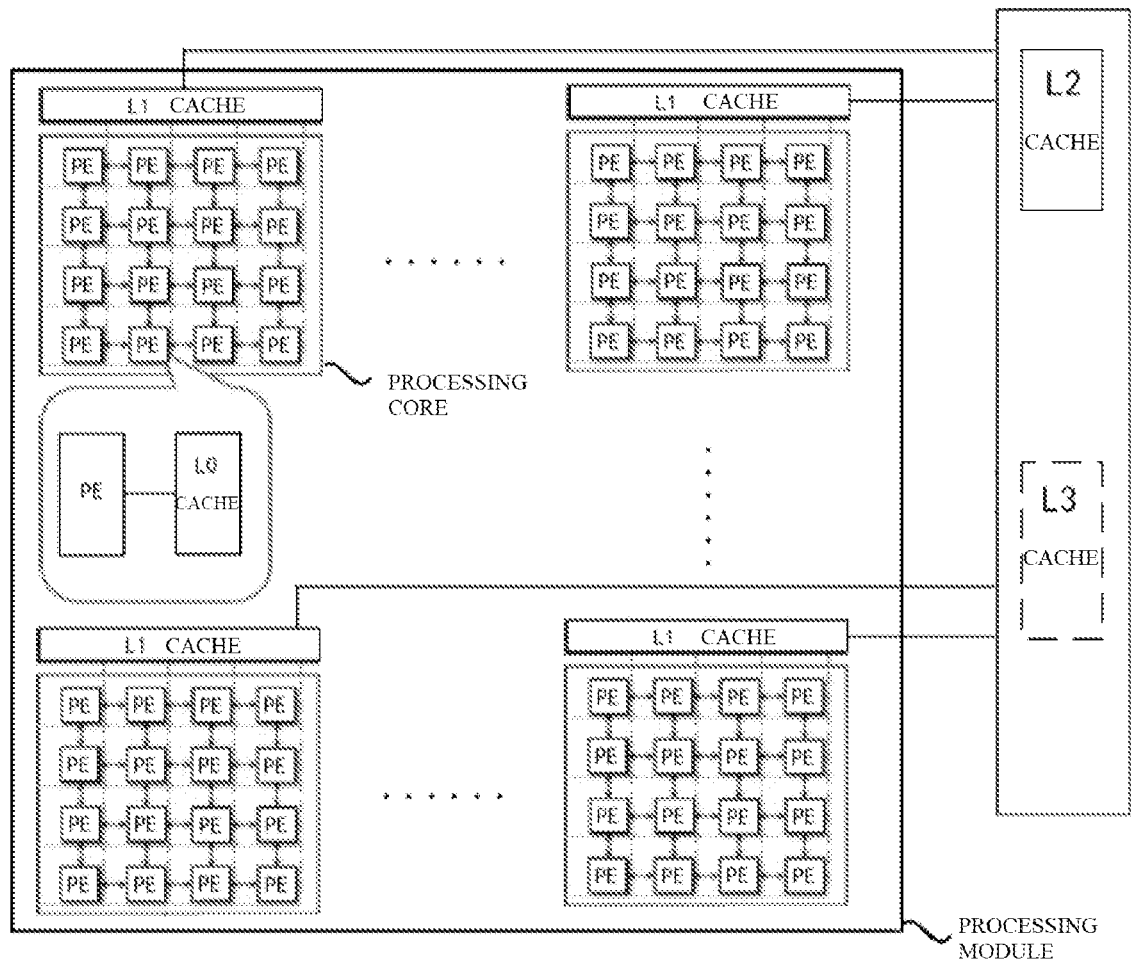
FIG. 1 is a schematic diagram illustrating a reconfigurable computing chip according to the embodiments of the present disclosure.

In order to make the purpose, technical solution and advantages of the embodiments of the present disclosure clearer, the technical solution of the embodiments of the present disclosure will be clearly and completely described below with reference to the drawings of the embodiments of the present disclosure. Obviously, the described embodiments are part of the embodiments of the present disclosure, but not all of them. Based on the described embodiments of the present disclosure, all the other embodiments obtained by ordinary skilled in the art without any creative labor belong to the protection scope of the present disclosure.

Unless otherwise defined, the technical or scientific terminologies used in the present disclosure should have their ordinary meanings as understood by those ordinary skilled in the art to which the present disclosure belongs. The words "first", "second" and the like used in the present disclosure do not indicate any order, quantity or significance, but are only used to distinguish from different constituent part. The word "comprise" or "include" or the like is intended to mean that the elements or objects appearing therebefore encompass the listed elements or objects appearing thereafter and their equivalents, without excluding other elements or objects. The word "connect" or "interconnect" or the like is not limited to physical or mechanical connections, but can include electrical connections, whether direct or indirect.

In order to keep the following description of the embodiments of the present disclosure clear and concise, part of the detailed description of known functionalities and known components is omitted in the present disclosure.

The following terminologies related to the present disclosure are briefly introduced to facilitate the illustration of the present disclosure.

Neural Networks: A neural network may refer to for example a computing architecture obtained by modeling, for example, a biological brain. In the neural network, nodes corresponding to brain neurons are connected with each other and co-operate to process the input data. There are various types of neural networks, such as but not limited to CNN, Recurrent Neural Network (RNN), etc. Generally, a model of neural network includes an input layer and an output layer, which are separated by at least one hidden layer. The hidden layer transforms the input received by the input layer into a representation useful for generating output in the output layer. The nodes in the network are fully-connected to the nodes in adjacent layers via edges, and there is no edge between the nodes within each layer. The data received at the nodes of the input layer of the neural network is propagated to the nodes of the output layer via any of hidden layer, activation layer, pooling layer, convolutional layer, etc. The input and the output of the neural network model may take various forms, which is not limited by the present disclosure.

Convolutional Neural networks (CNNs): CNN is a type of Feedforward Neural Networks that involves convolutional computation and has a structure of depth, and it is one of the representative algorithms for deep learning. A convolutional neural network has the ability of representation learning, and can perform shift-invariant classification on the input information according to its hierarchical structure, so it is also referred to as a "Shift-Invariant Artificial Neural Network (SIANN)". Specifically, the convolutional neural network includes an input layer, a hidden layer, and an output layer. For example, the hidden layer includes at least one convolutional layer, a pooling layer, and a fully-connected layer.

Convolutional Layers: The functionality of a convolutional layer is to perform feature extraction on the input data, and it contains a plurality of Input Filter Weights, for which each constituent element corresponds to one weight coefficient and one bias vector, which is similar to a neuron of a feedforward neural network. Each neuron in the convolutional layer is connected with a plurality of neurons in a proximate area in the previous layer, and the size of this area depends on the size of the convolution kernel. In some examples, this area is also referred to as a "receptive field", and its meaning may be analogous to that of the receptive field of the visual cortex cells. Optionally, when the convolution kernel operates, it will regularly sweep across the input features, perform multiplication and summation on the matrix elements of the input features in the receptive field and superpose the bias vectors.

Input Feature Maps: During processing data through a single convolutional layer, the input data may be referred to as input feature maps, and the set of output features extracted from the input feature maps may be referred to as output feature maps. That is, the convolutional layer performs convolution operation on the input feature maps through the convolution kernels, so as to acquire the output feature maps.

CNN convolution operators: in the convolutional layer of the convolutional neural network, in the input feature maps, the operation of acquiring the inner product of the data in different data windows and the convolution kernels is referred to as convolution, in which the input feature maps and the convolution kernels are the input data of the convolutional layer. This convolutional layer is referred to as a convolution operator.

Cache: A cache is a small-capacity memory between a core and a main memory (e.g., external memory). Its reading and writing speed is faster than that of the main memory, thus being capable of providing instructions and data to the central processing element at a high speed and improving the execution speed of the programs. With the continuous improvement of integration for semiconductor device, a multi-level cache system has emerged at present, and all the control logics of each level of cache are implemented by the internal controller of this level of cache. The cache includes zero-level cache, first-level cache, second-level cache and third-level cache.

L1 cache: L1 cache is the first-level cache which is located next to the CPU core. It is the cache which is most closely combined with the CPU. The first-level cache is divided into an instruction cache and a data cache. It has the smallest capacity, and is monopolized by individual cores/clusters.

L2 cache: L2 cache is the second-level cache, and is the cache at the second level of the hierarchy of the CPU. Its capacity would directly affect the performance of the CPU. It is usually monopolized by individual cores/clusters. Optionally, in some examples, L2 may also be shared by individual cores/clusters.

L3 cache: L3 cache is the third-level cache, and is the cache at the third level of the hierarchy of the CPU. It is used to further reduce the latency in memory. It is shared by a plurality of cores/clusters and has the largest capacity. Generally, L3 is also the Last Level Cache (LLC) of multi-core processors. L3 is coupled with external memory.

External Memory: It is a concept relative to the processor's internal memory, which is generally a Dynamic Random Access Memory (DRAM). It is generally connected to the third-level cache via a bus. The external memory has a large capacity, but the access speed is slow.

In order to better illustrate the present disclosure, the reconfigurable computing chip according to the embodiments of the present disclosure will be further illustrated below with reference to FIGS. 1 and 2.

FIG. 1 is a schematic diagram illustrating a reconfigurable computing chip according to the embodiments of the present disclosure. As shown in FIG. 1, the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

As an example, the first cache includes L2 cache and/or L3 cache, the second cache includes L1 cache, and the third cache includes L0 cache. It is worth noting that the reconfigurable computing chip may also include other components, such as other storage structures. However, since these components have nothing to do with the contents of the embodiments of the present disclosure, their illustrations and descriptions are omitted here. For example, the reconfigurable computing chip shown in FIG. 1 optionally adopts a 4-level cache storage structure, i.e., L0 cache-L3 cache. Of course, the reconfigurable computing chip of the embodiments of the present disclosure may further adopt just a 3-level cache storage structure, i.e., L0 cache-L2 cache, or a combination of cache storage structure and external memory storage structure, and this is not limited by the present disclosure.

For example, the processing module may be a matrix of processing cores, composed of n×m processing cores. That is, each processing module may include a plurality of processing cores arranged in a matrix of n rows and m columns. Herein, each processing core is a matrix composed of u×v processing elements (PEs). That is, each processing core includes a plurality of processing elements (PEs) arranged in a matrix of u rows and v columns. While just a plurality of processing elements arranged in 4 rows and 4 columns are shown in FIG. 1, those skilled in the art should understand that the present disclosure is not limited thereto. The above n, m, u, and v are all positive integers, and the present disclosure does not limit the specific value range of these four values.

As shown in FIG. 1, each PE may be equipped with an exclusive L0 cache, from which the PE may read data directly. Each processing core may be equipped with an exclusive L1 cache, while L2 cache and L3 cache are shared by all of the PEs throughout the processing module.

Optionally, according to the above architecture, during the training and reasoning of a neural network (such as CNN) including a convolutional layer, the reconfigurable computing chip in FIG. 1 may be dynamically configured to perform convolution-related mapping. For example, the reconfigurable computing chip according to the embodiments of the present disclosure may map the convolutional layer to the hardware, and implement the mapping of functionalities, the mapping of data flows as well as related control processing, by dynamically configuring the above-mentioned array of processing elements.

For example, the reconfigurable computing chip in FIG. 1 may be dynamically configured to perform convolution process on an input feature map and a convolution kernel to obtain an output feature map, and each of the plurality of processing elements is dynamically configured to perform a multiplication-plus-addition process on a part of the input feature map and a part of the convolution kernel to obtain a part of the output feature map.

It is assumed that a certain convolutional layer corresponds to performing convolution process on the input feature map "Input" and the convolution kernel "Weights" according to the step size "Stride" to obtain the output feature map "Output".

As an example, it is assumed that the dimensions of the input feature map "Input" is N*C*H*W, where C is also referred to as the total number of channels of the input feature map "Input", H is also referred to as the height of the input feature map "Input", W is also referred to as the width of the input feature map "Input", and N is another dimension other than the total number of channels, the height and the width of the input feature map "Input". For example, the input feature map "Input" may be represented with the following pseudo-code.

Input Feature Maps: Input[N][C][H][M]

The dimensions of the convolution kernel "Weights" is M*C*R*S, where, similarly, C is also referred to as the total number of channels of the convolution kernel "Weights" (which is the same as the total number of channels of the input feature map "Input"), R is also referred to as the height of the convolution kernel "Weights", S is also referred to as the width of the convolution kernel "Weights", and M is another dimension other than the total number of channels, the height and the width of the convolution kernel "Weights". For example, the convolution kernel Weights may be represented with the following pseudo-code.

Input Filter Weights: Weights[M][C][R][S]

The dimensions of the output feature map "Output" is N*M*E*F, where M is also referred to as the total number of channels of the output feature map "Output", E is also referred to as the height of the output feature map "Output", F is also referred to as the width of the output feature map "Output", and N is another dimension other than the total number of channels, the height and the width of the output feature map "Output". Herein, as an example, $$E = \frac{H - R}{Stride} + 1, \text{ and}$$

$$F = \frac{W - S}{Stride} + 1.$$

For example, the output feature map "Output" may be represented with the following pseudo-code.

Output Feature Maps: Output[N] [M][E][F]

All the above values are positive integers. With respect to the above assumptions, the computation flow of the CNN convolution operator in the reconfigurable computing chip shown in FIG. 1 may be abstracted as a multi-level nested loop structure shown in FIG. 2.

For example, the computation flow of the reconfigurable computing chip that performs convolution process on the input feature map and the convolution kernel to obtain the output feature map will be reconfigured based at least in part on individual dimensions (e.g., one or more of N, C, H, W, M, R, S, E, and F) of the input feature map, the convolution kernel, and the output feature map, so as to adjust computation paths and/or data paths during the training and reasoning of the convolutional layer of the neural network, thus improving the utilization rate of reconfigurable computing resources and improving the efficiency of reading, writing and computing for data.

Taking dimension C (the total number of channels) of the input feature map "Input" as an example, how to reconfigure the computing paths and/or the data paths of the reconfigurable computing chip to perform the convolution process, is illustrated. Specifically, the maximum value of one dimension that a single PE of the reconfigurable computing chip can process at one time is often less than C. Therefore, it is necessary to split dimension C into different dimensions so as to correspond to different loop levels, respectively.

It is assumed that C is factorized into C0, C1, C2, C3, and C4, which respectively correspond to different loop levels, and C0×C1×C2×C3×C4≥C. Herein, C1 means that the traversal computation of dimension C is divided into C1 parallel subtasks, with a number C0×C2×C3×C4 of channels contained in each subtask, and one processing core assigned to complete the computation.

Similarly, dimension N is factorized into N0, N1, N2, N3, and N4, which respectively correspond to different loop levels (L0 loop body, PE loop body, L1 loop body, L2 loop body, and L3 loop body), and N0×N1×N2×N3×N4≥N; dimension M is factorized into M0, M1, M2 and M4, which respectively correspond to different loop levels (L0 loop body, PE loop body, L1 loop body, and L3 loop body), and M0×M1×M2×M4≥M; dimension E is factorized into E0, E1, E2 and E3, which respectively correspond to different loop levels (L0 loop body, PE loop body, L1 loop body, and L2 loop body), and E0×E1×E2×E3≥E; dimension R is factorized into R0 and R1, which respectively correspond to different loop levels (PE loop body and L1 loop body), and R0×R1≥R; and dimension S is factorized into S0, which respectively correspond to different loop levels (L0 loop body), and S1≥S.

The setting of the above loop body may vary with the changes of the hardware structure of the reconfigurable computing chip and the convolutional neural network, and the above setting mode is merely an example. For example, the factorizing methods of dimension S and dimension R may be exchanged, so that dimension S may be factorized into S0 and S1, which respectively correspond to different loop levels (PE loop body and L1 loop body), and R may be factorized into R0. This is not limited by the present disclosure.

In addition, as an example, the processing module in FIG. 1 may also call C1 parallel subtasks, which will be computed by C1 processing cores in parallel. This is not limited by the present disclosure.

Figure 2:
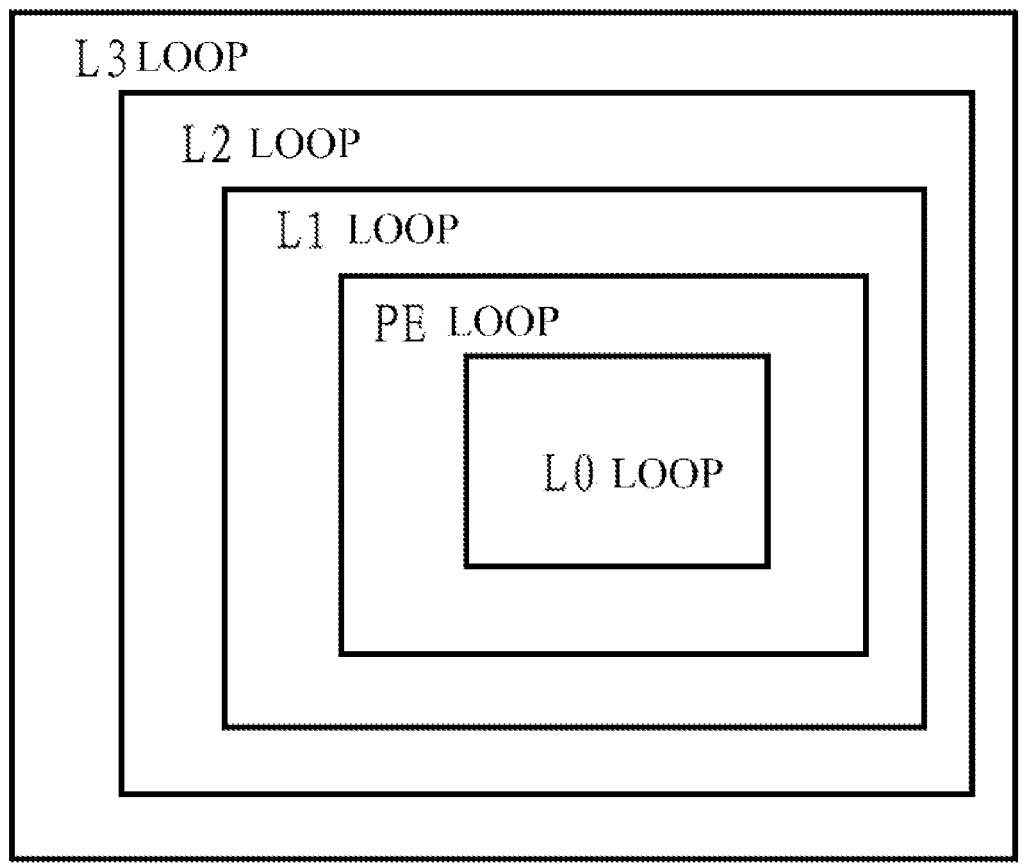
FIG. 2 is a schematic diagram illustrating a multi-level nested loop structure of the computation flow of CNN convolution operator in the reconfigurable computing chip of FIG. 1.

As shown in FIG. 2, the smallest loop body is L0 loop, that is, the smallest loop level is L0 loop level. The PE loop body may include a plurality of L0 loops. The L1 loop body may include a plurality of PE loops. The L2 loop body may include a plurality of L1 loops. The L3 loop body may include a plurality of L2 loops.

In the L0 loop body, the L0 cache of a single PE in the processing core may store the input data with a number C0 of channels (C0 is smaller than the maximum dimension that a single PE may process at one time), and a single PE may compute the data in its exclusive L0 cache. Similarly, a single PE may obtain data from its exclusive L0 cache for other dimensions for computing in a similar way. As an example, the pseudo-code for a single L0 loop body may be:

```
for(e0=0; e0<E0; e0++){
  for(n0=0; n0<N0; n0++){
    for(f0=0; f<F0; f0++){
      for(s0=0; s0<S0; s0++){
        for(c0=0; c0<C0; c0++){
          for(m0=0; m0<M0; m0++){
            Output_part += Input_part * Weight_part}}}}}}
```

Herein, in each computation performed by the PE, Output part, Input part and Weight_part each corresponds to the part of the output feature map, the input feature map and the convolution kernel indicated by the current m0, c0, s0, f0, n0 and e0. Therefore, according to the above parameters (e.g., one or more of E0, N0, F0, S0, C0 and M0), each PE is dynamically configured to acquire corresponding data from the L0 cache. That is, according to one or more of the above parameters, the data paths involving the third cache (e.g., L0 cache) are dynamically adjusted.

Specifically, it is assumed that a total number of N1×M1× C1×E1×R0 PEs are allocated for parallel computation. Herein, a single PE completes the loop body of the above L0. All the procedures of PE computing PE-specific L0 loop body in parallel are also referred to as PE loop bodies. As an example, the pseudo-codes of the PE loop bodies corresponding to the PEs may be:

```
parallel-for(n1=0; n1<N1; n1++){
    parallel-for(m1=0; m1<M1; m1++){
        parallel-for(c1=0; c1<C1; c1++){
            parallel-for(e1=0; e1<E1; e1++){
                parallel-for(r1=0; r1<R1; r1++){
                    L0 loop body}}}}}
```

Therefore, according to the above parameters (e.g., one or more of N1, M1, C1, E1, and R1), each PE is dynamically configured to perform a corresponding computation in parallel. That is, according to one or more of the above parameters, the computation paths involved in individual PEs are dynamically adjusted, and the computation procedure of the reconfigurable computing chip is driven according to the flow of the data stream.

Optionally, with respect to dimension C, when the PE finishes the computation of its specific C0 channel and outputs the computation result for this part, the L0 cache of the PE acquires the data of the next C0 channel from the L1 cache and updates the data stored in the L0 cache. L1 cache may store input data with a number C0×C2 of channels. The loop body that reads data from the L1 cache is also referred to as an L1 loop body. As an example, the pseudo-code corresponding to the L1 loop body may be:

```
for(n2=0; n2<N2; n2++){
    for(c2=0; c2<C2; c2++){
        for(e2=0; e2<E2; e2++){
            for(r1=0; r1<R1; r1++){
                for(m2=0; m2<M2; m2++){
                    PE loop body}}}}}
```

Therefore, according to the above parameters (e.g., one or more of N2, C2, E2, R1 and M2), each L0 cache is dynamically configured to acquire corresponding data from the L1 cache. That is, according to one or more of the above parameters, the data paths involving the second cache (e.g., L1 cache) are dynamically adjusted.

Continuing with respect to dimension C, when the L0 cache reads out all the channel data in the L1 cache, the L1 cache would acquire the next C0×C2 channel data from the L2 cache and update the data in the L1 cache. The loop body that reads data from the L2 cache is also referred to as an L2 loop body. As an example, the pseudo-code corresponding to the L2 loop body may be:

```
for(n3=0; n3<N3; n3++){
    for(m3=0; m3<M3; m3++){
        for(e3=0; e3<E3; e3++){
            for(c3=0; c3<C3; c3++){
                L1 loop body}}}}
```

In a similar way, with respect to dimension C, when the L1 cache reads out all the channel data in the L2 cache, the L2 cache would acquire the next C2×C4 channel data from the L3 cache and update the data in the L2 cache. The loop body that reads data from the L3 cache is also referred to as an L3 loop body. As an example, the pseudo-code corresponding to the L3 loop body may be:

```
for(n4=0; n4<N4; n4++) {
    for(m4=0; m4<M4; m4++) {
        for(c4=0; c4<C4; c4++) {
            {L2 loop body}}}
```

Therefore, according to the above parameters (e.g., one or more of N3, M3, E3, C3, N4, M4, and C4), each L1 cache is dynamically configured to acquire corresponding data from the L2 cache, and each L2 cache is dynamically configured to acquire corresponding data from the L3 cache. That is, according to one or more of the above parameters, the data paths involving the third cache (e.g., L2 cache and L3 cache) are dynamically adjusted.

While dimensions, N, C, H, W, M, R, S, E, and F, are known for the specific input feature map "Input", convolution kernel "Weights" and output feature map "Output", the factorizing methods for the individual dimensions above are variable. For example, it is assumed that dimension C=12, which may be factorized into C0=2, C1=2, C2=1, C3=3, and C4=1, so as to meet C0×C1×C2×C3×C4≥C. Or, it may be factorized into C0=1, C1=3, C2=4, C3=1, and C4=1, so as to meet C0×C1×C2×C3×C4≥C. The combination of the factorizing methods for dimension C is essentially infinite, but in practical, the hardware structure of the reconfigurable computing chip is limited.

It is assumed that with respect to any of the nine dimensions N, C, H, W, M, R, S, E, and F, the reconfigurable computing chip shown in FIG. 1 may satisfy 100 factorizing combinations of the infinite number of factorizing methods corresponding to the dimension, thus achieving a scheme containing $100^9$ operator mapping. Operator mapping refers to splitting the computation procedure and the computed data for an operator according to the storage structure and the processing element configuration of the reconfigurable computing chip, so as to correspond to the execution flows of the chip, one by one. The present disclosure takes the mapping of the CNN operator as an example, and this is not limited by the present disclosure.

To this end, the present disclosure also provides a method for configuring a reconfigurable computing chip (e.g., the reconfigurable computing chip according to the present disclosure shown in FIG. 1) to filter out the optimal operator mapping scheme from a large number of operator mapping schemes.

Figure 3:
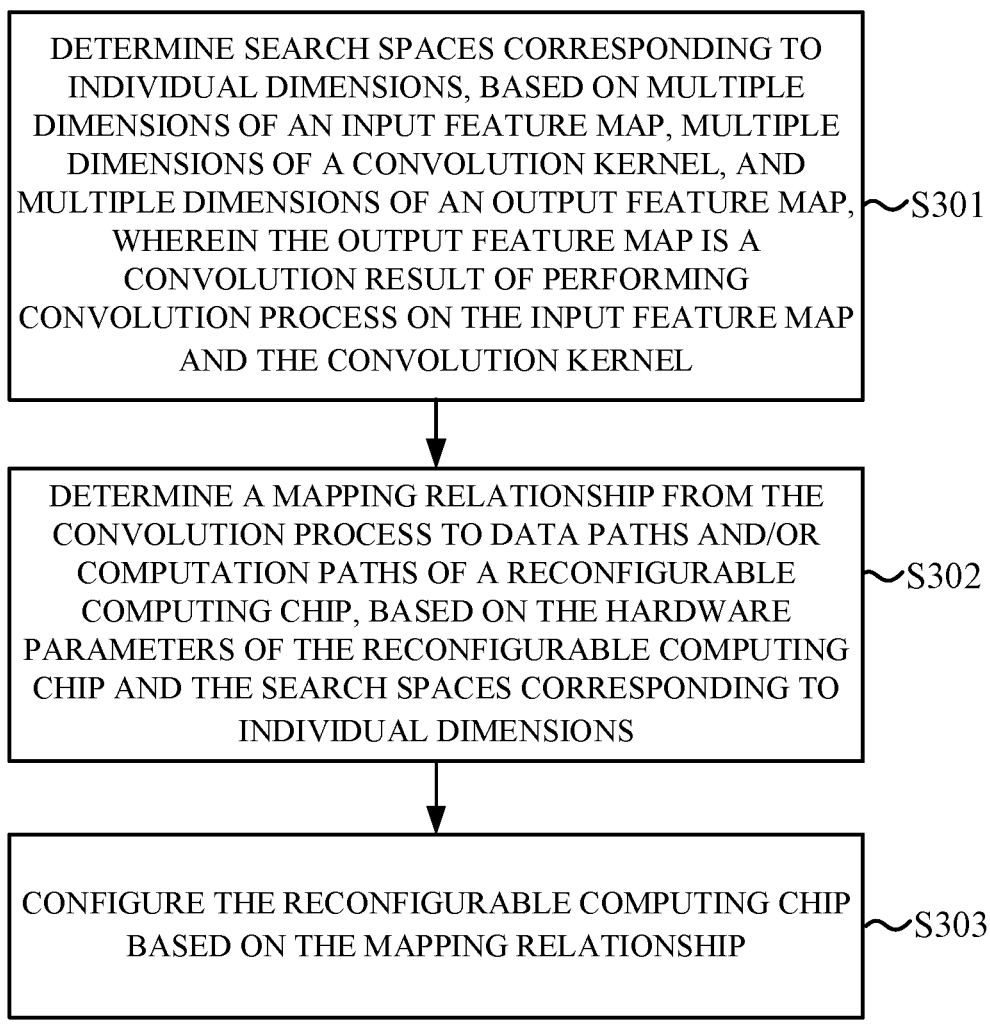
FIG. 3 is a flowchart illustrating a method for configuring the reconfigurable computing chip according to the embodiments of the present disclosure.
Figure 4:
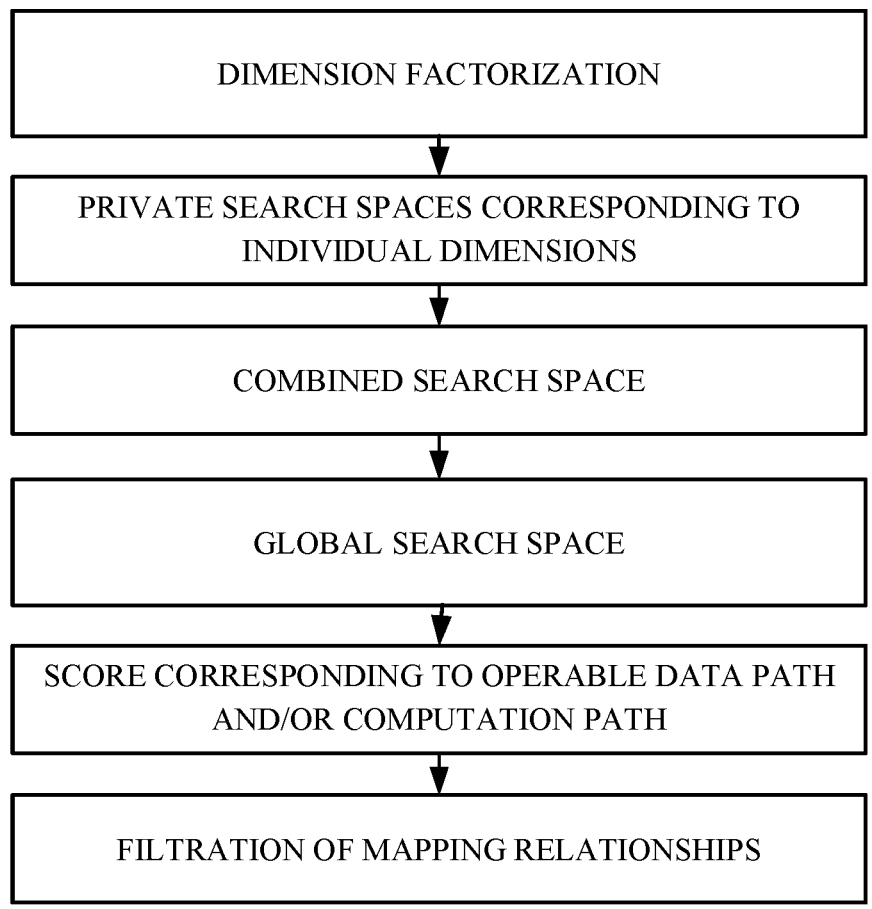
FIG. 4 is a schematic diagram illustrating a method for configuring the reconfigurable computing chip according to the embodiments of the present disclosure.

FIG. 3 is a flowchart illustrating method 300 for configuring a reconfigurable computing chip according to the embodiments of the present disclosure. FIG. 4 is a schematic diagram illustrating method 300 for configuring a reconfigurable computing chip according to the embodiments of the present disclosure. The reconfigurable computing chip may be the reconfigurable computing chip shown in FIG. 1, which, for example, comprises a processing module including a plurality of processing cores sharing a first cache, wherein each of the plurality of processing cores includes a plurality of processing element sharing a second cache, and each of the plurality of processing elements monopolizes a third cache corresponding to said processing element. As an example, the first cache includes L2 cache and/or L3 cache, the second cache includes L1 cache, and the third cache includes L0 cache.

Referring to FIG. 3, an example method 300 includes one or all of steps S301-S303. This is not limited by the present disclosure. Herein, steps S301-S302 may be executed by any physical hardware equipped with software for optimizing the configuration of the reconfigurable computing chip, or by any physical hardware, which matches the reconfigurable computing chip, equipped with software available for hardware-programming the reconfigurable computing chip. Step S303 may be executed by any physical hardware, which matches the reconfigurable computing chip, equipped with a software for hardware-programming the reconfigurable computing chip. The present disclosure does not limit the execution subjects for individual steps of the example method 300, as long as it can achieve the purpose of the present disclosure.

As an example, the above-mentioned physical hardware may be any terminal device, for example, it may be a stationary terminal such as a desktop computer, a mobile terminal with network functionality, such as a smart phone, a tablet, a portable computer, a handheld device, a personal digital assistant, a smart wearable device, a vehicle-mounted terminal, etc., or any combination thereof. This is not limited specifically by the embodiments of the present disclosure.

As another example, the above physical hardware may also be any cloud server, e.g., an independent server for configuring and optimizing the reconfigurable computing chip and/or performing neural network-related computations, or may be a server cluster or distributed system composed of a plurality of physical servers, or may also be a cloud server for basic cloud computation, providing cloud services, cloud databases, cloud computing, cloud functions, cloud storage, network services, cloud communication, middleware services, domain name services, security services, location services, as well as big data and artificial intelligence platforms.

For example, in step S301, search spaces corresponding to individual dimensions are determined based on multiple dimensions of an input feature map, multiple dimensions of a convolution kernel, and multiple dimensions of an output feature map, wherein the output feature map is a convolution result of performing convolution process on the input feature map and the convolution kernel.

For example, referring to the above, the input feature map may be the above-mentioned input feature map "Input", with the dimensions of N*C*H*W, where C is also referred to as the total number of channels of the input feature map "Input", H is also referred to as the height of the input feature map "Input", W is also referred to as the width of the input feature map "Input", and N is another dimension other than the total number of channels, the height and the width of the input feature map "Input".

Similarly, the convolution kernel may be the above-mentioned convolution kernel "Weights", with the dimension of M*C*R*S, where, similarly, C is also referred to as the total number of channels of the convolution kernel "Weights" (which is the same as the total number of channels of the input feature map "Input"), R is also referred to as the height of the convolution kernel "Weights", S is also referred to as the width of the convolution kernel "Weights", and M is another dimension other than the total number of channels, the height and the width of the convolution kernel "Weights".

For another example, the dimension of the output feature map "Output" is N*M*E*F, where M is also referred to as the total number of channels of the output feature map Output, E is also referred to as the height of the output feature map "Output", F is also referred to as the width of the output feature map "Output", and N is another dimension other than the total number of channels, the height and the width of the output feature map "Output". According to the rules of convolution operation, the convolution process is performed on the input feature map "Input" and the convolution kernel "Weights" according to the step size "Stride" to obtain the output feature map "Output". Therefore, as an example, $$E = \frac{H-R}{\text{Stride}} + 1, \text{ and}$$

$$F = \frac{W-S}{\text{Stride}} + 1.$$

As an example, referring to FIG. 4, according to the individual dimensions above, factorizing these dimensions can obtain the dimension factors corresponding to individual dimensions. For example, take dimension N (where N is used as both dimension identifier and dimension size) as an example, its factorized factor combination may be expressed as:

$\emptyset_i^N = \{N_0, N_1, N_2, \ldots, N_n\}$ and $\Pi_{i=0}^{i=n} N_i \geq N$, where n represents a number of dimension factors. All of the combinations of dimension factors constitute the search space $U^N = \{\emptyset_0^N, \emptyset_1^N, \emptyset_2^N, \ldots, \emptyset_m^N\}$ with a dimension of N, where m represents the size of the search space. Mathematically, m may be infinite. For example, it is assumed that N=5 and n=2, that is, the N can be represented by a product of N0 and N1, as long as the product of N0 and N1 is larger than N. The process of representing N as a product of multiple factors can be called "factorizing". Then there can be {N0, N1}={1,5} or {2,3} or {3,2} or {70,2} and so on. {N0, N1} can be called a factorizing combination for N.

As an example, n is related to storage architecture and processing architecture of the reconfigurable computing chip. For example, in the example of FIG. 1, dimension N may be factorized into N0, N1, N2, N3, and N4, and its purpose is to correspond to the loop levels (L0 loop body, PE loop body, L1 loop body, L2 loop body, and L3 loop body). Therefore, step S301 further includes: determining a number of dimension factors corresponding to individual dimensions of the input feature map, the convolution kernel, and the output feature map, based on storage architecture and processing architecture of the reconfigurable computing chip; and determining search spaces corresponding to individual dimensions, based on the individual dimensions and the number of dimension factors corresponding to the individual dimensions.

For example, next, in step S302, a mapping relationship from the convolution process to data paths and/or computation paths of the reconfigurable computing chip is determined based on hardware parameters of the reconfigurable computing chip and the search spaces corresponding to individual dimensions.

Continuing to refer to FIG. 4, for example, where the maximum dimension that a single PE can process is 6, the above-mentioned {N0, N1}={70,2} cannot meet the hardware parameter limitation of the reconfigurable computing chip. Therefore, the search spaces corresponding to the individual dimensions above may be filtered according to the hardware parameters of the reconfigurable computing chip. That is, step S302 may include: determining sets of private constraints corresponding to individual dimensions, based on the hardware parameters of the reconfigurable computing chip; determining private search spaces corresponding to individual dimensions, based on the sets of private constraints and the search spaces corresponding to the individual dimensions; and determining the mapping relationship from the convolution process to the data paths and/or the computation paths of the reconfigurable computing chip, based on the private search space corresponding to the individual dimensions.

For example, taking a search space $U^N$ with a dimension of N as an example, according to the hardware parameter limitation of the reconfigurable computing chip, a set of several private constraints $\nabla_N$ related to dimension N is obtained, such as $1 \leq N_0 \leq 4$, $N_1 \times N_2 \leq 8$, etc. According to the set $\nabla_N$ of private constraints, the combinations of the dimension factors in the search space $U^N$ is filtered, that is, a combination of private search spaces $\overline{U}^N = \{\emptyset_0^N, \emptyset_1^N, \emptyset_2^N, \ldots, \emptyset_k^N\}$ satisfying the set of private constraints is obtained, where k represents the size of the filtered search space, the subscript represents the serial number of the combination of the dimension factors, and the superscript is the dimension identifier. Therefore, the search space $\overline{U}^N$ satisfying a set of private constraints is also referred to as a private search space corresponding to dimension N.

For another example, referring to FIG. 4, step S302 further includes: determining a global search space, based on the set of joint constraints and the private search spaces corresponding to individual dimensions, the global search space corresponding to all operable data paths and/or computation paths on which convolution process is performed by the reconfigurable computing chip; and determining the mapping relationship from the convolution process to the computation paths of the reconfigurable computation chip, based on the global search space.

Optionally, firstly, the private search spaces corresponding to the individual dimensions above are arbitrarily combined to obtain a combined search space. Take FIG. 1 as an example, at least the private search spaces $\overline{U}^N$, $\overline{U}^C$, $\overline{U}^M$, $\overline{U}^R$, $\overline{U}^S$, $\overline{U}^E$ and $\overline{U}^F$ corresponding to the individual dimensions may be obtained. Any combination of the dimension factors is selected from each private search space, and an operator mapping scheme of the combined search space is obtained by combination, an operator mapping scheme corresponding to all of the operable data paths and/or computation paths on which convolution process is performed by the reconfigurable computing chip. For example, an operator mapping scheme may be $\emptyset_i = \{\emptyset_3^N, \emptyset_1^C, \emptyset_5^M, \emptyset_4^R, \emptyset_4^S, \emptyset_6^E, \emptyset_{10}^F\}$, indicating that a factorizing combination with a serial number of 3 in the private search space $\overline{U}^N$, a factorizing combination with a serial number of 1 in the private search space $\overline{U}^C$, a factorizing combination with a serial number of 5 in the private search space $\overline{U}^M$, etc. are selected. Finally, the combined search space $U = \{\emptyset_0, \emptyset_1, \emptyset_2, \ldots, \hbar_p\}$ is obtained, where p represents the size of the global search space.

Next, the combined search space U is filtered. According to the requirements of the hardware parameters, a set $\nabla$ of joint constraints corresponding to at least two of the individual dimensions is obtained, such as $M_0 \times S_0 \leq 16$, $N_1 \times C_2 \geq 5$, etc. According to the set $\nabla$ of joint constraints, the operator mapping schemes in the combined search space U are filtered, so as to obtain the global search space $\overline{U} = \{\emptyset_0, \emptyset_1, \emptyset_2, \ldots, \emptyset_q\}$ satisfying the constraints, where q represents the size of the filtered global search space. According to the present disclosure, the size of the global search space may be reduced and the search time may be reduced, by introducing a set of joint constraints and a set of private constraints to filter the search space.

Furthermore, the determining the mapping relationship from the convolution process to the computation paths of the reconfigurable computation chip, based on the global search space further comprises: determining a score corresponding to all of the operable data paths and/or computation paths, based on the global search space, the score being a weighted value of utilization rate, power consumption and computing speed of individual processing elements of the reconfigurable computing chip in a case that the reconfigurable computing chip performs convolution process according to the operable data paths and/or computation paths; and determining the mapping relationship from the convolution process to the computation paths of the reconfigurable computing chip, based on the score corresponding to all of the operable data paths and/or computation paths.

For example, referring to FIG. 4, the operator mapping evaluation model of each operator mapping scheme may be obtained by traversing the above global search space $\overline{U}$ and analyzing the computing mode and caching mode corresponding to each operator mapping scheme, so as to obtain a set γ of single evaluation metrics corresponding to each operator mapping scheme. According to the present disclosure, the evaluation metrics are computed by introducing the operator mapping evaluation model in analytical mode (based on a combination of parameter computations of the operator mapping scheme), thus shortening the computation time of the operator mapping evaluation model greatly, compared with the simulation mode (based on the simulation statistics of a chip simulator).

Furthermore, the above-mentioned operator mapping evaluation model introduces a caching mode, so that the operator mapping evaluation model may first check whether the intermediate result corresponding to a certain computation step is cached, before performing this computation step, and if so, it acquires the cached result; otherwise if not, it computes directly and caches the intermediate result. Such caching operations can speed up the search procedure and reduce the search time.

For example, the set γ of single evaluation metrics includes values corresponding to metrics such as utilization rate, power consumption, and delay of processing elements. Then, according to a comprehensive evaluation metric (which is a function for weighting single evaluation metrics such as utilization rate, power consumption, and delay of PEs), this operator mapping scheme is scored. Finally, a score set ∀ that corresponds to all of the operable data paths and/or computation paths corresponding to the operator mapping schemes is obtained, and each score value in ∀ corresponds to a score corresponding to an operable data path and/or computation path. According to the present disclosure, the operator mapping scheme is scored by introducing comprehensive evaluation metrics (related to the output of a function of a plurality of single evaluation metrics), thus being able to achieve an operator mapping scheme with more comprehensive performance, compared with single evaluation metrics (such as utilization rate, power consumption, data reuse rate, etc. of PEs).

For example, the score values of the score set ∀ may be ranked, where the operator mapping scheme corresponding to the highest score value is the optimal operator mapping scheme, corresponding to an operator mapping scheme with a high utilization rate of reconfigurable computing resources, high efficiency of reading, writing, and computing for data (that is, a mapping relationship from the convolution process to the computation paths of the reconfigurable computing chip that can achieve high utilization rate of reconfigurable computing resources, high efficiency of reading, writing, and computing for data).

For example, next, in step S303, the reconfigurable computing chip may be configured based on the mapping relationship.

For example, according to the dimension factors of individual dimensions corresponding to this mapping, the reconfigurable computing chip is hardware-programmed, so that it can implement convolution process with the various pseudo-codes above as an example.

Optionally, in order to further optimize the reading efficiency for data, the above mapping relationship may also be split. For example, dimension factors corresponding to a first sub-computation path and a second sub-computation path may also be adjusted based on the mapping relationship, wherein the first sub-computation path corresponds to a sub-computation path associated with the processing element of the reconfigurable computing chip acquiring data from the third cache, and the second sub-computation path corresponds to a sub-computation path corresponding to the processing element of the reconfigurable computing chip acquiring data from the second cache.

For example, the arranging order of dimension factors in the L1 loop body and the PE loop body may be exchanged. With the examples of individual pseudo-codes described with reference to FIG. 1, for any computation state in the procedure of executing the pseudo-code described with reference to FIG. 1, taking dimension C as an example, before the exchange, its corresponding subscript $c=c4\times C3\times C2\times C1\times C0+c3\times C2\times C1\times C0+c2\times C1\times C0+c1\times C0+c0$; after the exchange, its corresponding subscript $c=c4\times C3\times C1\times C2\times C0+c3\times C1\times C2\times C0+c1\times C2\times C0+c2\times C0+c0$. It is the same with other dimensions occurring in the PE loop body. Therefore, it can be realized that, in the L0 cache, the data required for the PE's current/next computation can be read from the L1 cache every time, without the L1 cache pulling data from the L2 cache/L3 cache, thus improving the hit rate of data in the L1 cache and the data continuity in the L1 cache, further improving the data reading efficiency and speeding up the convolutional computation.

For example, the parallel operation subtasks assigned to the individual PEs may be further optimized according to a data reuse rate filtering rule. For example, data reuse rates corresponding to individual ones in a set of parallel subtask allocation schemes may be determined based on the set of parallel subtask allocation schemes corresponding to the mapping relationship; a parallel subtask allocation scheme corresponding to the mapping relationship may be determined based on the data reuse rate; and the data to be computed by the processing element of the reconfigurable computing chip may be allocated based on the parallel subtask allocation scheme corresponding to the mapping relationship.

As an example, the parallel subtasks (as shown in FIG. 1, the number of the subtasks is $N1\times M1\times C1\times E1\times R0$) may be respectively assigned to corresponding PEs in the processing module for execution, according to the data reuse rate filtering rule. The data reuse rate filtering rule is as follows: traversing all of the feasible assigning schemes, and selecting the scheme with the highest data reuse rate for the input feature map and the convolution kernel, as the final assigning scheme, where the data reuse rate is defined as: data reuse rate=(actual amount of data loaded/theoretical amount of data loaded). Herein, theoretical amount of data loaded=sum of amount of data computed by individual PEs, and actual amount of data loaded=sum of individual amount of data computed−common amount of data. Therefore, the same data may be reused as much as possible between adjacent PEs, thus reducing the overhead of data reading. For example, in this case, as much data as possible that can be reused by adjacent PEs may be reserved in the L1 cache, so as to reduce the number of times that the L1 cache repeatedly pulls the same data from the L2 cache/L3 cache. Therefore, the reduction of amount of data moved and power consumption is achieved.

Therefore, with respect to the operations involved in CNN (Convolutional Neural Network) of neural networks, the present disclosure proposes an effective method for configuring a reconfigurable computing chip, so as to improve the utilization rate of reconfigurable computing resources and improve the efficiency of reading, writing and computing for data.

Furthermore, the present disclosure also provides a method for convolution process, which comprises: performing convolution process on an input feature map and a convolution kernel with a reconfigurable computing chip to obtain an output feature map, wherein a plurality of processing elements of the reconfigurable computing chip are dynamically configured to perform a multiplication-plus-addition process on a part of the input feature map and a part of the convolution kernel to obtain a part of the output feature map; wherein the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

Figure 5:
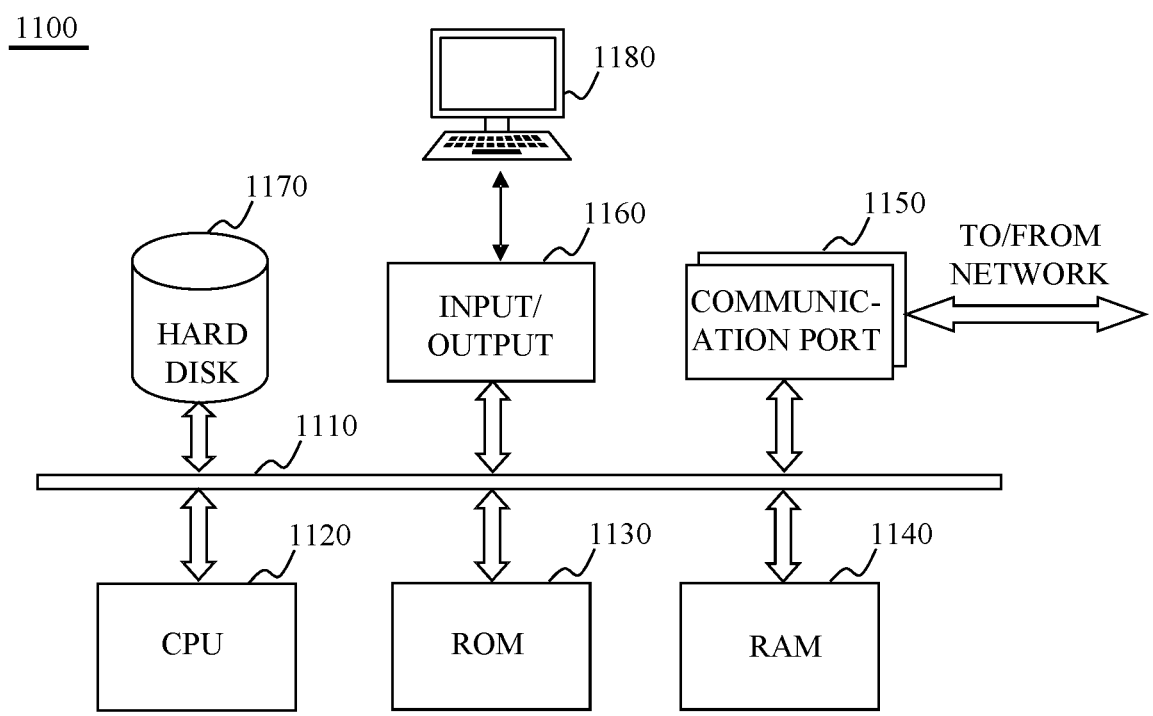
FIG. 5 illustrates a schematic diagram of an architecture of an exemplary computing device according to the embodiments of the present disclosure.

According to another aspect of the present disclosure, the disclosure also provides a computing device 1100, which may be used as a terminal device or a server. As shown in FIG. 5, the computing device 1100 may include a bus 1110, one or more CPUs 1120, a read only memory (ROM) 1130, a random access memory (RAM) 1140, a communication port 150 connected to a network, an input/output component 1160, a hard disk 1170, and the like. A storage device in the computing device 1100, such as the ROM 1130 or the hard disk 1170, may store various data or files used for computer processing and/or communication as well as program instructions executed by the CPU. The computing device 1100 may also include a user interface 1180. Of course, the architecture shown in FIG. 5 is merely exemplary, and in implementing different devices, one or more components of the computing device shown in FIG. 5 may be omitted as needs.

The embodiments of the present embodiments may also be implemented as a computer-readable storage medium. The computer-readable storage medium according to the embodiments of the present disclosure has stored computer readable instructions thereon. When the computer readable instructions are executed by a processor, the method according to the embodiments of the present disclosure described with reference to the above figures may be performed. The computer readable storage medium include, but are not limited to, volatile memory and/or nonvolatile memory, for example. The volatile memory may include, for example, random access memory (RAM) and/or cache, etc. The non-volatile memory may include, for example, read only memory (ROM), hard disk, flash memory, etc.

According to the embodiments of the present disclosure, there is also provided a computer program product or computer program, which includes computer readable instructions stored in a computer readable storage medium. The processor of the computer device may read the computer-readable instructions from the computer-readable storage medium, and the processor executes the computer-readable instructions, so that the computer device performs the methods described in the individual embodiments above.

According to another aspect of the embodiments of the present disclosure, there is also provided a computer-readable storage medium having stored thereon computer-readable instructions which, when executed by a processor, cause the processor to perform the method as described in any of the individual aspects above of the present disclosure.

According to another aspect of the embodiments of the present disclosure, there is also provided a computer program product including computer readable instructions which, when executed by a processor, cause the processor to perform the method as described in any of the individual aspects above of the present disclosure.

It should be noted that, each of the embodiments in this specification is described in a progressive way, and the differences between each embodiment and other embodiments are highlighted, so the same and similar parts between individual embodiments may be referred to each other.

In several embodiments provided in the present application, it should be understood that each block in the flowchart or block diagram may represent a module, program segment or part of code, which contains one or more executable instructions for implementing the specified logical functionalities. It should also be noted that in some alternative implementations, the functionalities marked in the blocks may also occur in a different order than those marked in the drawings. For example, two consecutive blocks may actually be executed basically in parallel, or sometimes be executed in a reverse order, depending on the functionalities involved. It should also be noted that each block in the block diagram and/or flowchart, and the combination of blocks in the block diagram and/or flowchart, may be implemented by a dedicated hardware-based system that performs the specified functions or actions, or may be implemented by a combination of dedicated hardware and computer instructions.

It should be noted that, herein, relational terminologies such as first and third are merely used to distinguish one entity or operation from another entity or operation, and do not necessarily require or imply any such actual relationship or sequence between these entities or operations. Moreover, the terminologies such as "comprise", "include" or any other variation thereof is intended to encompass non-exclusive inclusion, so that a process, method, article or equipment that includes a series of elements not only includes those elements, but also includes other elements not explicitly listed, or also includes the elements inherent to such process, method, article or equipment. Without further restrictions, the element defined by the statement "including one . . . " does not exclude the existence of another identical element in the process, method, article or equipment that includes the said element.

The above are merely the preferred embodiments of the present disclosure, and are not intended to limit the present disclosure. For those skilled in the art, the present disclosure may be modified and varied. Any modification, equivalent substitution, improvement, etc. made within the spirit and principle of the present disclosure shall be included in the protection scope of the present disclosure. It should be noted that like reference numerals and letters indicate like items in the following drawings, so once a certain item is defined in one drawing, it does not need to be further defined and explained in subsequent drawings.

The above are merely the specific embodiments of the present disclosure, but the protection scope of the present disclosure is not limited to this. Any skilled familiar with the art can easily think of changes or substitutions within the technical scope disclosed in the present disclosure, which should be covered by the protection scope of the present disclosure. Therefore, the protection scope of the present disclosure should be based on the protection scope of the appended claims and their equivalents.

What is claimed is:

1. A reconfigurable computing chip, comprising:
a processing module comprising a plurality of processing cores sharing a first cache, wherein each of the plurality of processing cores includes a plurality of processing elements sharing a second cache, and each of the plurality of processing elements monopolizes a third cache corresponding to said processing element,
wherein the reconfigurable computing chip is dynamically configured to perform a convolution process on an input feature map and a convolution kernel to obtain an output feature map, and each of the plurality of processing elements is dynamically configured to perform a multiplication-plus-addition process on a part of the input feature map and a part of the convolution kernel to obtain a part of the output feature map.

2. The reconfigurable computing chip of claim 1, wherein the first cache includes L2 cache and/or L3 cache, the second cache includes L1 cache, and the third cache includes L0 cache.

3. The reconfigurable computing chip of claim 1, wherein computation paths and/or data paths of the reconfigurable computing chip are reconfigured to perform the convolution process, based at least in part on individual dimensions of the input feature map, the convolution kernel, and the output feature map.

4. The reconfigurable computing chip of claim 1, wherein each of the plurality of processing elements is dynamically configured to perform the multiplication-plus-addition process on a corresponding part of the input feature map and a corresponding part of the convolution kernel, based at least in part on a mapping relationship from the convolution process to the data paths and/or the computation paths of the reconfigurable computing chip.

5. A method for configuring a reconfigurable computing chip, comprising:
determining search spaces corresponding to individual dimensions, based on multiple dimensions of an input feature map, multiple dimensions of a convolution kernel, and multiple dimensions of an output feature map, wherein the output feature map is a convolution result of performing a convolution process on the input feature map and the convolution kernel;
determining a mapping relationship from the convolution process to data paths and/or computation paths of the reconfigurable computing chip, based on hardware parameters of the reconfigurable computing chip and the search spaces corresponding to individual dimensions; and
configuring the reconfigurable computing chip based on the mapping relationship.

6. The method of claim 5, wherein the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

7. The method of claim 5, wherein the determining search spaces corresponding to individual dimensions, based on multiple dimensions of an input feature map, multiple dimensions of a convolution kernel, and multiple dimensions of an output feature map further comprises:
determining a number of dimension factors corresponding to individual dimensions of the input feature map, the convolution kernel, and the output feature map, based on storage architecture and processing architecture of the reconfigurable computing chip; and determining search spaces corresponding to individual dimensions, based on the individual dimensions and the number of dimension factors corresponding to the individual dimensions.

8. The method of claim 5, wherein the determining a mapping relationship from the convolution process to data paths and/or computation paths of the reconfigurable computing chip, based on hardware parameters of the reconfigurable computing chip and the search spaces corresponding to individual dimensions further comprises:

determining sets of private constraints corresponding to individual dimensions, based on the hardware parameters of the reconfigurable computing chip;

determining private search spaces corresponding to individual dimensions, based on the sets of private constraints and the search spaces corresponding to the individual dimensions; and determining the mapping relationship from the convolution process to the data paths and/or the computation paths of the reconfigurable computing chip, based on the private search spaces corresponding to the individual dimensions.

9. The method of claim 8, wherein the determining the mapping relationship from the convolution process to the data paths and/or the computation paths of the reconfigurable computing chip, based on the private search spaces corresponding to the individual dimensions further comprises:

determining a set of joint constraints corresponding to at least two of the individual dimensions, based on the hardware parameters of the reconfigurable computing chip;

determining a global search space, based on the set of joint constraints and the private search spaces corresponding to individual dimensions, the global search space corresponding to all operable data paths and/or computation paths on which the convolution process is performed by the reconfigurable computing chip; and determining the mapping relationship from the convolution process to the data paths and/or the computation paths of the reconfigurable computation chip, based on the global search space.

10. The method of claim 9, wherein the determining the mapping relationship from the convolution process to the data paths and/or the computation paths of the reconfigurable computation chip, based on the global search space further comprises:

determining a score corresponding to all operable data paths and/or computation paths, based on the global search space, the score being a weighted sum of utilization rate, power consumption, and computing speed of individual processing elements of the reconfigurable computing chip in a case that the reconfigurable computing chip performs convolution process according to the operable data paths and/or computation paths; and determining the mapping relationship from the convolution process to the computation paths of the reconfigurable computing chip, based on the score corresponding to all of the operable data paths and/or computation paths.

11. The method of claim 6, wherein the configuring the reconfigurable computing chip based on the mapping relationship further comprises:

adjusting dimension factors corresponding to a first sub-computation path and a second sub-computation path, based on the mapping relationship, wherein the first sub-computation path corresponds to a sub-computation path associated with the processing element of the reconfigurable computing chip acquiring data from the third cache, and the second sub-computation path corresponds to a sub-computation path corresponding to the processing element of the reconfigurable computing chip acquiring data from the second cache.

12. The method of claim 6, wherein the configuring the reconfigurable computing chip based on the mapping relationship further comprises:

determining data reuse rates corresponding to individual ones in a set of parallel subtask allocation schemes, based on the set of parallel subtask allocation schemes corresponding to the mapping relationship;

determining a parallel subtask allocation scheme corresponding to the mapping relationship, based on the data reuse rates; and allocating data to be computed by the processing element of the reconfigurable computing chip, based on the parallel subtask allocation scheme corresponding to the mapping relationship.

13. A convolution processing device, comprises:

one or more processors; and one or more memories, in which computer readable codes are stored, which when executed by the one or more processors, cause the one or more processors to perform the method of claim 5.

14. The device of claim 13, wherein the reconfigurable computing chip comprises a processing module including a plurality of processing cores sharing a first cache, wherein each of the plurality of processing cores includes a plurality of processing elements sharing a second cache, and each of the plurality of processing elements monopolizes a third cache corresponding to said processing element.

15. The device of claim 13, wherein the determining search spaces corresponding to individual dimensions, based on multiple dimensions of an input feature map, multiple dimensions of a convolution kernel, and multiple dimensions of an output feature map further comprises:

determining a number of dimension factors corresponding to individual dimensions of the input feature map, the convolution kernel, and the output feature map, based on storage architecture and processing architecture of the reconfigurable computing chip; and determining search spaces corresponding to individual dimensions, based on the individual dimensions and the number of dimension factors corresponding to the individual dimensions.

16. The device of claim 13, wherein the determining a mapping relationship from the convolution process to data paths and/or computation paths of the reconfigurable computing chip, based on hardware parameters of the reconfigurable computing chip and the search spaces corresponding to individual dimensions further comprises:

determining sets of private constraints corresponding to individual dimensions, based on the hardware parameters of the reconfigurable computing chip;

determining private search spaces corresponding to individual dimensions, based on the sets of private constraints and the search spaces corresponding to the individual dimensions; and determining the mapping relationship from the convolution process to the data paths and/or the computation paths of the reconfigurable computing chip, based on the private search spaces corresponding to the individual dimensions.

17. The device of claim 16, wherein the determining the mapping relationship from the convolution process to the data paths and/or the computation paths of the reconfigurable computing chip, based on the private search spaces corresponding to the individual dimensions further comprises:

determining a set of joint constraints corresponding to at least two of the individual dimensions, based on the hardware parameters of the reconfigurable computing chip;

determining a global search space, based on the set of joint constraints and the private search spaces corresponding to individual dimensions, the global search space corresponding to all operable data paths and/or computation paths on which the convolution process is performed by the reconfigurable computing chip; and determining the mapping relationship from the convolution process to the data paths and/or the computation paths of the reconfigurable computation chip, based on the global search space.

18. The device of claim 17, wherein the determining the mapping relationship from the convolution process to the data paths and/or the computation paths of the reconfigurable computing chip, based on the global search space further comprises:

determining a score corresponding to all operable data paths and/or computation paths, based on the global search space, the score being a weighted sum of utilization rate, power consumption, and computing speed of individual processing elements of the reconfigurable computing chip in a case that the reconfigurable computing chip performs convolution process according to the operable data paths and/or computation paths; and determining the mapping relationship from the convolution process to the computation paths of the reconfigurable computing chip, based on the score corresponding to all of the operable data paths and/or computation paths.

19. The device of claim 15, wherein the configuring the reconfigurable computing chip based on the mapping relationship further comprises:

adjusting dimension factors corresponding to a first sub-computation path and a second sub-computation path, based on the mapping relationship, wherein the first sub-computation path corresponds to a sub-computation path associated with the processing element of the reconfigurable computing chip acquiring data from the third cache, and the second sub-computation path corresponds to a sub-computation path corresponding to the processing element of the reconfigurable computing chip acquiring data from the second cache.

20. The device of claim 15, wherein the configuring the reconfigurable computing chip based on the mapping relationship further comprises:

determining data reuse rates corresponding to individual ones in a set of parallel subtask allocation schemes, based on the set of parallel subtask allocation schemes corresponding to the mapping relationship;

determining a parallel subtask allocation scheme corresponding to the mapping relationship, based on the data reuse rates; and allocating data to be computed by the processing element of the reconfigurable computing chip, based on the parallel subtask allocation scheme corresponding to the mapping relationship.

* * * * *